United States Patent
Akaho

(10) Patent No.: US 11,171,566 B2
(45) Date of Patent: Nov. 9, 2021

(54) DRIVE MODULE, POWER SUPPLY CONTROLLER AND SWITCHING POWER SUPPLY

(71) Applicant: Rohm Co., Ltd., Kyoto (JP)

(72) Inventor: Tadashi Akaho, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 97 days.

(21) Appl. No.: 16/704,203

(22) Filed: Dec. 5, 2019

(65) Prior Publication Data

US 2020/0186042 A1 Jun. 11, 2020

(30) Foreign Application Priority Data

Dec. 10, 2018 (JP) .............................. JP2018-230994

(51) Int. Cl.
*H02M 3/158* (2006.01)
*H02M 1/00* (2006.01)
*H02M 1/084* (2006.01)

(52) U.S. Cl.
CPC ....... *H02M 3/1588* (2013.01); *H02M 1/0035* (2021.05); *H02M 1/084* (2013.01)

(58) Field of Classification Search
CPC ... H02M 3/1588; H02M 1/084; H02M 1/0035
See application file for complete search history.

(56) References Cited

U.S. PATENT DOCUMENTS

| | | | | |
|---|---|---|---|---|
| 2002/0181577 A1* | 12/2002 | Bowling | ................. | H02P 27/08 375/238 |
| 2013/0271101 A1* | 10/2013 | Nanov | .................... | H02M 1/32 323/282 |
| 2015/0130429 A1* | 5/2015 | Horie | ........................ | G06F 1/26 323/271 |
| 2015/0137776 A1* | 5/2015 | Thomas | .............. | H02M 3/1588 323/271 |
| 2015/0303799 A1* | 10/2015 | Tang | ................... | H02M 3/1584 323/271 |
| 2016/0301309 A1* | 10/2016 | Tateishi | .................. | H02M 1/08 |
| 2020/0136508 A1* | 4/2020 | Bandyopadhyay | ......................... | H02M 3/1588 |

FOREIGN PATENT DOCUMENTS

JP 2017-195768 10/2017

* cited by examiner

*Primary Examiner* — Harry R Behm
(74) *Attorney, Agent, or Firm* — Fish & Richardson P.C.

(57) ABSTRACT

A drive module for use in a switching power supply generating output voltage from input voltage by turning on/off an output transistor and a synchronous rectification transistor includes: a zero-cross detection circuit detecting zero-cross of inductor current flowing when the synchronous rectification transistor is turned on; a drive logic circuit turning on the output transistor and turning off the synchronous rectification transistor when control signal is at first logic level, turning off the output transistor and turning on the synchronous rectification transistor when the control signal is at second logic level, and turning off both the output transistor and the synchronous rectification transistor when the zero-cross is detected; and a logic level switching circuit switching the control signal to third logic level when the zero-cross is detected, wherein the zero-cross detection circuit, the drive logic circuit, and the logic level switching circuit are integrated in a single package.

10 Claims, 10 Drawing Sheets

DRIVE MODULE, POWER SUPPLY CONTROLLER AND SWITCHING POWER SUPPLY

CROSS-REFERENCE TO RELATED APPLICATION

This application is based upon and claims the benefit of priority from Japanese Patent Application No. 2018-230994, filed on Dec. 10, 2018, the entire contents of which are incorporated herein by reference.

TECHNICAL FIELD

The present disclosure relates to a drive module and a power supply controller for use in a switching power supply.

BACKGROUND

In recent years, as a component of a switching power supply, a drive module, in which a pair of MOSFETs (Metal-Oxide-Semiconductor Field Effect Transistors) forming a switch output stage and a drive logic circuit for driving the MOSFETs are integrated in one package (so-called DrMOS), has been put into practical use.

In the related art, an example of the above-described technology is disclosed.

However, in the switching power supply using the above-described conventional drive module, there may be many signals and external components necessary for mounting a light load mode (which is an operation mode for reducing a switching loss by setting the switch output stage to an output high impedance state (HiZ) at a light load). Hereinafter, specific examples will be simply described.

FIG. 11 is a view showing a first example of a switching power supply in the related art. In the switching power supply 100 of this example in the related art, when the zero-cross of an inductor current IL is detected in a zero-cross detection circuit 123 of a power supply controller 120, a skip signal SKIP is transmitted to a control circuit 121 and a control signal PWM from an output circuit 122 to a drive module 110 is switched from an L level (for example, GND) to an M level (for example, an intermediate value between an H level and the L level). As a result, both transistors M1 and M2 are turned off by a drive logic circuit 112 and a switch output stage 111 enters an output high impedance state (HiZ). However, the switching power supply 100 of the example of the related art requires external components (a resistor R1 and a capacitor C1) for current detection. Further, three signals (the control signal PWM and current detection signals IS+ and IS−) are required for each one-phase (one-channel) drive module 110.

FIG. 12 is a view showing a second example of the switching power supply in the related art. In the switching power supply 200 of this example in the related art, a zero-cross detection circuit 213 that monitors a switch voltage SW and detects a zero-cross of an inductor current IL is integrated in a drive module 210. Accordingly, the aforementioned resistor R1 and capacitor C1 are not required. Further, the number of signals required for each drive module 110 can be reduced from three (PWM, IS+ and IS−) to two (PWM and SKIP). However, there is room for further improvement in reducing the number of signals.

SUMMARY

Some embodiments of the present disclosure provide a drive module and a power supply controller with a few required signals and external components, and a switching power supply including the same.

According to one embodiment of the present disclosure, there is provided a drive module for use in a switching power supply that generates an output voltage from an input voltage by turning on/off an output transistor and a synchronous rectification transistor. The drive module includes: a zero-cross detection circuit configured to detect a zero-cross of an inductor current that flows when the synchronous rectification transistor is turned on; a drive logic circuit configured to turn on the output transistor and turn off the synchronous rectification transistor when a control signal is at a first logic level, turn off the output transistor and turn on the synchronous rectification transistor when the control signal is at a second logic level, and turn off both the output transistor and the synchronous rectification transistor when the zero-cross is detected; and a logic level switching circuit configured to switch the control signal to a third logic level that is neither the first logic level nor the second logic level when the zero-cross is detected, wherein the zero-cross detection circuit, the drive logic circuit, and the logic level switching circuit are integrated in a single package.

In some embodiments, the output transistor and the synchronous rectification transistor may be further integrated in the package.

In some embodiments, the package may be a WLCSP (Wafer Level Chip Size Package), and at least a part of switch terminal groups connected to both the output transistor and the synchronous rectification transistor may be arranged between an input voltage terminal group and a ground voltage terminal group in a plan view of the package.

According to another embodiment, there is provided a power supply controller for use in a switching power supply that generates an output voltage from an input voltage by turning on/off an output transistor and a synchronous rectification transistor. The power supply controller includes: an input/output circuit configured to set a control signal to a first logic level when the output transistor is turned on and the synchronous rectification transistor is turned off, set the control signal to a second logic level when the output transistor is turned off and the synchronous rectification transistor is turned on, and enter an input standby state after setting the control signal to the second logic level; and a control circuit configured to detect that the control signal is switched to a third logic level that is neither the first logic level nor the second logic level in the input standby state, and transition to a light load mode.

According to another embodiment, there is provided the switching power supply that generates the output voltage from the input voltage and supplies the output voltage thus generated to a load. The switching power supply includes: the drive module; and the power supply controller.

In some embodiments, the drive module may further include a logic level fixing circuit that fixes the control signal to a logic level depending on a model of the drive module until the drive module is enabled, and the power supply controller may be configured to set the input/output circuit in the input standby state until the drive module is enabled, and perform a model discrimination or a connection determination of the drive module from the logic level of the control signal.

In some embodiments, the power supply controller may be further configured to set an enable signal of the drive module to the first logic level when the drive module is disabled, set the enable signal to the second logic level when the drive module is enabled in a first operation mode, and set the enable signal to the third logic level when the drive module is enabled in a second operation mode.

In some embodiments, the drive module may be provided in n parallel phases (where n≥2), and the power supply controller may be configured to drive the drive module of each phase by a phase shift of 2π/n.

In some embodiments, a first wiring length from the power supply controller to the drive module may be larger than a second wiring length from the drive module to the load.

In some embodiments, the power supply controller may be configured to perform an output feedback control according to a voltage across the load that is detected by a remote sense method.

DETAILED DESCRIPTION

<Switching Power Supply (Overall Configuration)>

Figure 1:
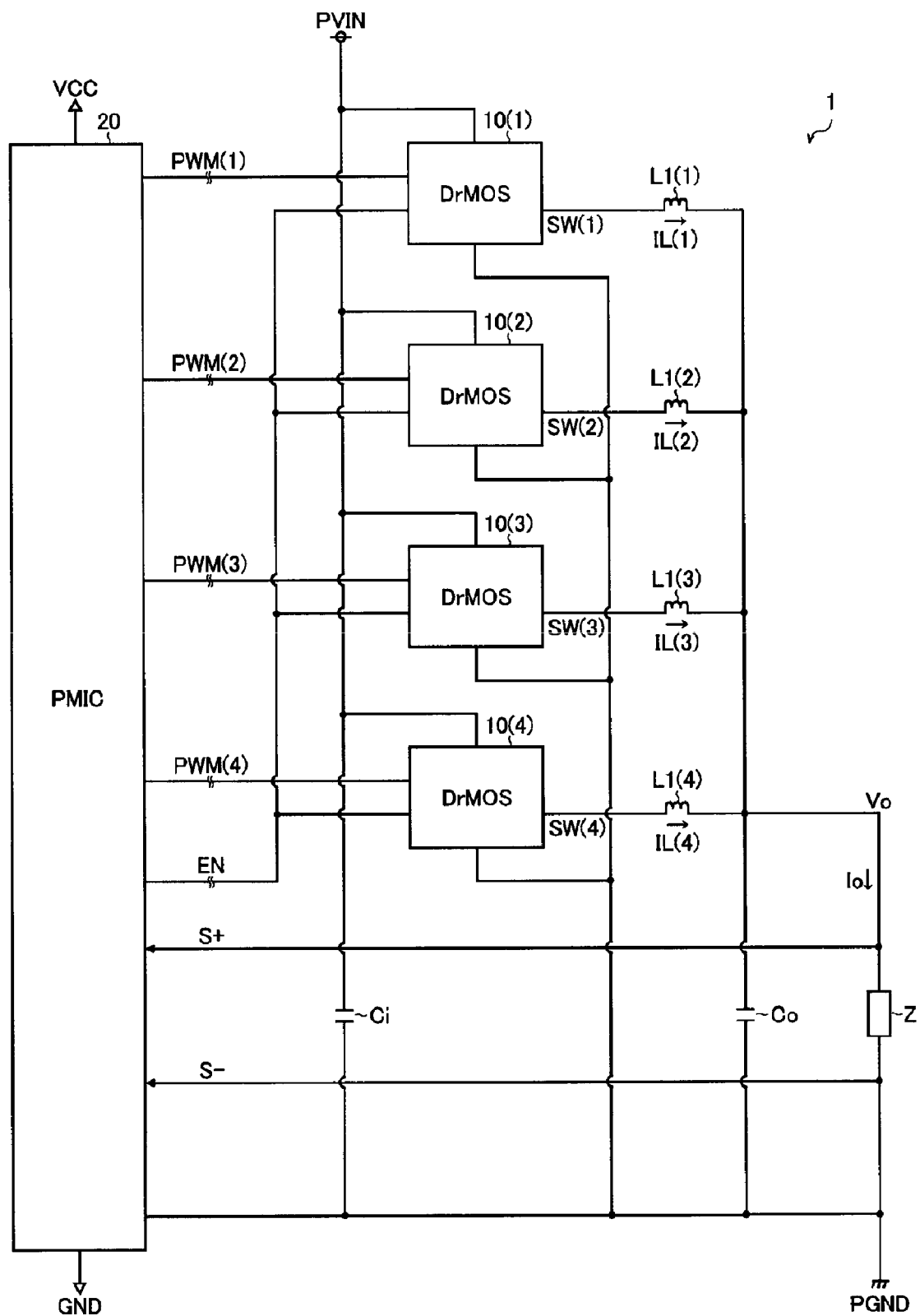
FIG. 1 is a view showing an overall configuration of a switching power supply.

FIG. 1 is a view showing the overall configuration of a switching power supply 1. The switching power supply 1 of this configuration example is a multi-phase (four-phase in this figure) step-down DC/DC converter that generates an output voltage Vo from an input voltage PVIN and supplies the same to a load Z (CPU (Central Processing Unit) or the like), and includes drive modules 10(1) to 10(4) connected in four parallel phases, a power supply controller 20, inductors L1(1) to L1(4), and capacitors Ci and Co.

Each of the drive modules 10(1) to 10(4) is a semiconductor device (so-called DrMOS), in which a pair of MOSFETs forming a switch output stage and a drive logic circuit (not shown) for driving the MOSFETs are integrated in one package.

The pair of MOSFETs is connected between an application terminal of the input voltage PVIN and an application terminal of a ground voltage PGND, and is basically on/off-controlled according to control signals PWM(1) to PWM(4). As a result, switch voltages SW(1) to SW(4) that are pulse-driven between the input voltage PVIN and the ground voltage PGND are output from the drive modules 10(1) to 10(4), respectively, and are summed, rectified and smoothed by the inductors L1(1) to L1 (4) and the capacitor Co to generate the output voltage Vo to the load Z.

By using the drive modules 10(1) to 10(4), circuit scale of the switching power supply 1 can be greatly reduced as compared with a case where the pair of MOSFETs and the drive logic circuit are individually provided.

Further, when it is necessary to flow a large output current Io (for example, A order) to the load Z, the drive modules 10(1) to 10(4) may be arranged as close to the load Z as possible in some embodiments. In other words, a wiring length from the power supply controller 20 to the drive modules 10(1) to 10(4) (=a transmission path length of the control signals PWM(1) to PWM(4)) is made larger than a wiring length from the drive modules 10 (1) to 10 (4) to the load Z (=a transmission path length of inductor currents IL(1) to IL(4)) to route the control signals PWM (1) to PWM (4) as long as possible, so that a path through which the inductor currents IL(1) to IL(4) flow may be shortened in some embodiments.

According to such a configuration, it is possible to suppress a voltage drop due to a wiring resistance generated in the subsequent stage of the drive modules 10(1) to 10(4) as much as possible, thereby improve stability of the output voltage Vo.

The power supply controller 20 is a semiconductor device that controls the switching power supply 1 (so-called a PMIC (Power Management IC)). For example, the power supply controller 20 performs an output feedback control for obtaining a desired output voltage Vo by respectively generating the control signals PWM (1) to PWM (4) of the drive modules 10(1) to 10(4) according to a voltage across the load Z (=a difference value between remote sense signals S+ and S−), which is detected by a remote sense method.

The power supply controller 20 also has a function of outputting an enable signal EN having three values (H/M/L) common to the drive modules 10(1) to 10(4).

When EN=L (for example, GND), the drive modules 10(1) to 10(4) are disabled.

When EN=H (for example, VCC), the drive modules 10(1) to 10(4) are enabled in a first operation mode (=an operation mode in which pulse driving of the switch voltages SW(1) to SW(4) is always performed according to the control signals PWM(1) to PWM(4)).

When EN=M (for example, VCC/2), the drive modules 10(1) to 10(4) are enabled in a second operation mode (=an operation mode in which, in the zero-cross detection of the inductor currents IL(1) to IL(4), the control signals PWM(1) to PWM(4) are switched to the M level by themselves and the switch voltages SW(1) to SW(4) enter the output high impedance state (HiZ) by themselves).

Further, the power supply controller 20 appropriately enters an input standby state of the control signals PWM(1) to PMW(4) when EN=L or EN=M, and also has a function of performing a process of transitioning from a heavy load mode (PWM (Pulse Width Modulation) mode) to a light load mode (PFM (Pulse Frequency Modulation) mode) by detecting the respective logic levels of the control signals PWM(1) to PWM(4), or performing model discrimination or connection determination of the drive modules 10(1) to 10(4) (details of which will be described later).

The first ends of the inductors L1(1) to L1(4) are connected to the output terminals of the drive modules 10(1) to 10(4), respectively. The second ends of the inductors L1(1) to L1(4) are all connected to an application terminal of the output voltage Vo (=a high potential terminal of the load Z). Since the inductor currents IL(1) to IL(4) flow through the inductors L1(1) to L1(4), respectively, an output current Io (=IL(1)+IL(2)+IL(3)+IL(4)) obtained by adding these currents may be supplied to the load Z.

The capacitor Ci is connected between the application terminal of the input voltage PVIN and the application terminal of the ground voltage PGND and smooths the input voltage PVIN.

The capacitor Co is connected between the application terminal of the output voltage Vo and the application terminal of the ground voltage PGND (=between both terminals of the load Z) and smooths the output voltage Vo.

<Switching Power Supply (Main Part Configuration)>

Figure 2:
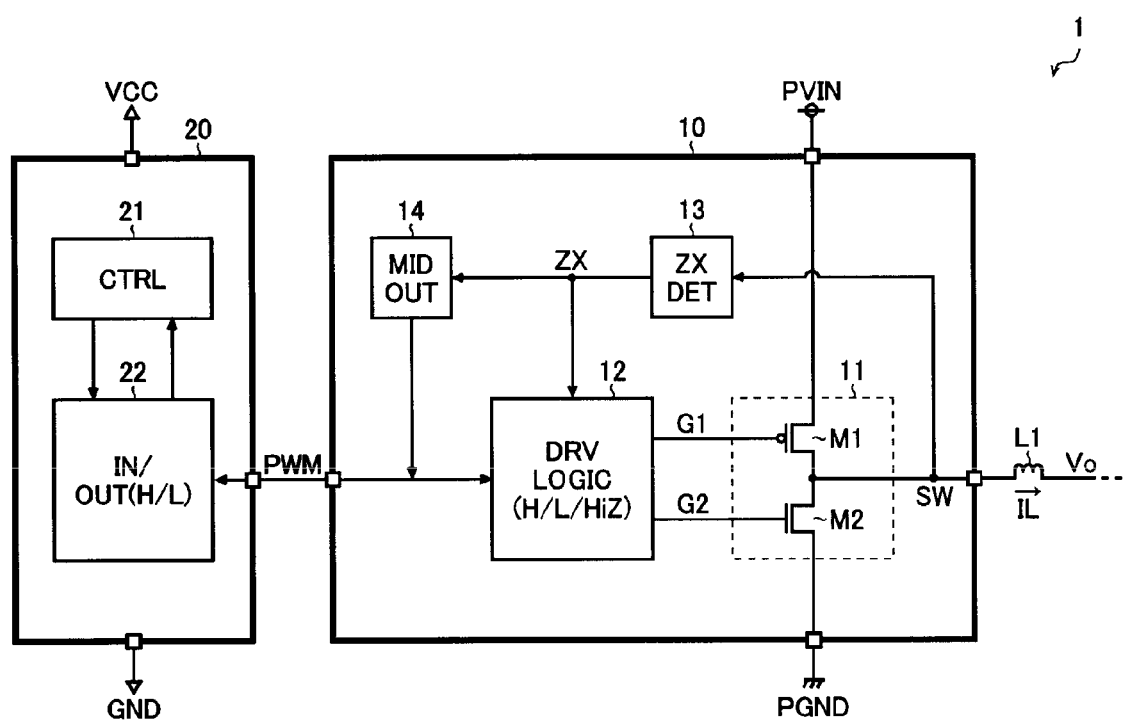
FIG. 2 is a view showing a main part configuration of the switching power supply.

FIG. 2 is a view showing a main part configuration (particularly, internal configurations of the drive module 10 and the power supply controller 20) of the switching power supply 1. The drive module 10 may be understood as any of four-phase (four-channel) drive modules 10(1) to 10(4). The same applies to the control signal PWM, the switch voltage SW, the inductor L1 and the inductor current IL, which correspond to any of the control signals PWM(1) to PWM (4), any of the switch voltages SW(1) to SW(4), any of the inductors L1(1) to L1(4), and any of the inductor currents IL(1) to IL(4), respectively.

First, the drive module 10 will be described. The drive module 10 of this configuration example includes a switch output stage 11, a drive logic circuit 12, a zero-cross detection circuit 13, and a logic level switching circuit 14, which are integrated in a single package.

The switch output stage 11 includes an output transistor M1 (for example, a P-channel MOS field effect transistor) and a synchronous rectification transistor M2 (for example, an N-channel MOS field effect transistor). A source of the transistor M1 is connected to the application terminal of the input voltage PVIN. The drains of the transistors M1 and M2 are connected to the application terminal of the switch voltage SW (=the output terminal of the drive module 10). The source of the transistor M2 is connected to the application terminal of the ground voltage PGND.

Gate signals G1 and G2 are input to the gates of the transistors M1 and M2, respectively. The transistor M1 is turned on when G1=L, and is turned off when G1=H. The transistor M2 is turned off when G2=L, and is turned on when G2=H.

For example, when the transistor M1 is turned on and the transistor M2 is turned off, SW=H(≈PVIN). Conversely, when the transistor M1 is turned off and the transistor M2 is turned on, SW=L (≈PGND). When both the transistors M1 and M2 are turned off, SW=HiZ (output high impedance state).

As the transistor M1, an NMOSFET may be used in place of the PMOSFET. However, in this case, a boosting means (a charge pump circuit and a bootstrap circuit) is required to raise the H level of the gate signal G1 above the input voltage PVIN.

The transistors M1 and M2 may be externally attached to a rear stage of the drive module 10.

The drive logic circuit 12 generates the gate signals G1 and G2 according to the control signal PWM and a zero-cross detection signal ZX. More specifically, basically, when PWM=H (for example, VCC), the drive logic circuit 12 sets G1=G2=L, turns on the transistor M1 and turns off the transistor M2. On the other hand, when PWM=L (for example, GND), the drive logic circuit 12 sets G1=G2=H, turns off the transistor M1 and turns on the transistor M2.

However, when the zero-cross detection signal ZX is at H level (=a logic level at the time of zero-cross detection) during the ON period of the transistor M2 (PWM=L and G1=G2=H), the drive logic circuit 12 sets G1=H and G2=L and turns off both the transistors M1 and M2.

The zero-cross detection circuit 13 detects the zero-cross (=a state in which the inductor current IL has a zero value or a value close thereto) of the inductor current IL that flows when the transistor M2 is turned on, and generates the zero-cross detection signal ZX as a result of the detection. For example, the zero-cross detection signal ZX is at L level when the zero-cross is not detected, and at H level when the zero-cross is detected.

When the zero-cross of the inductor current IL is detected (ZX=H), the logic level switching circuit 14 switches the control signal PWM to M level (for example, VCC/2) that is neither H level (for example, VCC) nor L level (for example, GND) (details of which will be described later).

In addition to the above-described circuit blocks, the drive module 10 may further include, for example, a reference voltage generation circuit that generates an internal reference voltage REF from the power supply voltage VCC, or various protection circuits (UVLO [Under Voltage Lock Out], OCP [Over Current Protection], TSD [Thermal Shut Down], and the like), which are integrated in the drive module 10.

Next, the power supply controller 20 will be described. The power supply controller 20 of this configuration example includes a control circuit 21 and an input/output circuit 22, which are integrated in the power supply controller 20.

The control circuit 21 is a main constituent that performs output feedback control (on-duty control) of the control signal PWM so as to obtain the desired output voltage Vo from the input voltage PVIN. In addition, the control circuit 21 also has a function of monitoring a logic level of the control signal PWM with the input/output circuit 22 set in an input standby state, and performing switching of an operation mode of the switching power supply 1 and model discrimination or connection determination of the drive module 10 according to the monitoring result (details of which will be described later).

The input/output circuit 22 is a circuit block that inputs and outputs the control signal PWM, and its operation state (output state or input standby state) is switched according to an instruction from the control circuit 21. When the input/output circuit 22 is in the output state, the input/output circuit 22 sets PWM=H when the transistor M1 is turned on and the transistor M2 is turned off, and sets PWM=L when the transistor M1 is turned off and the transistor M2 is turned on. On the other hand, when the input/output circuit 22 is in the input standby state, the input/output circuit 22 detects the logic level (H/L/M) of the control signal PWM and outputs the detection result to the control circuit 21 (details of which will be described later).

<Logic Level Switching Circuit (M Level Output Circuit)>

Figure 3:
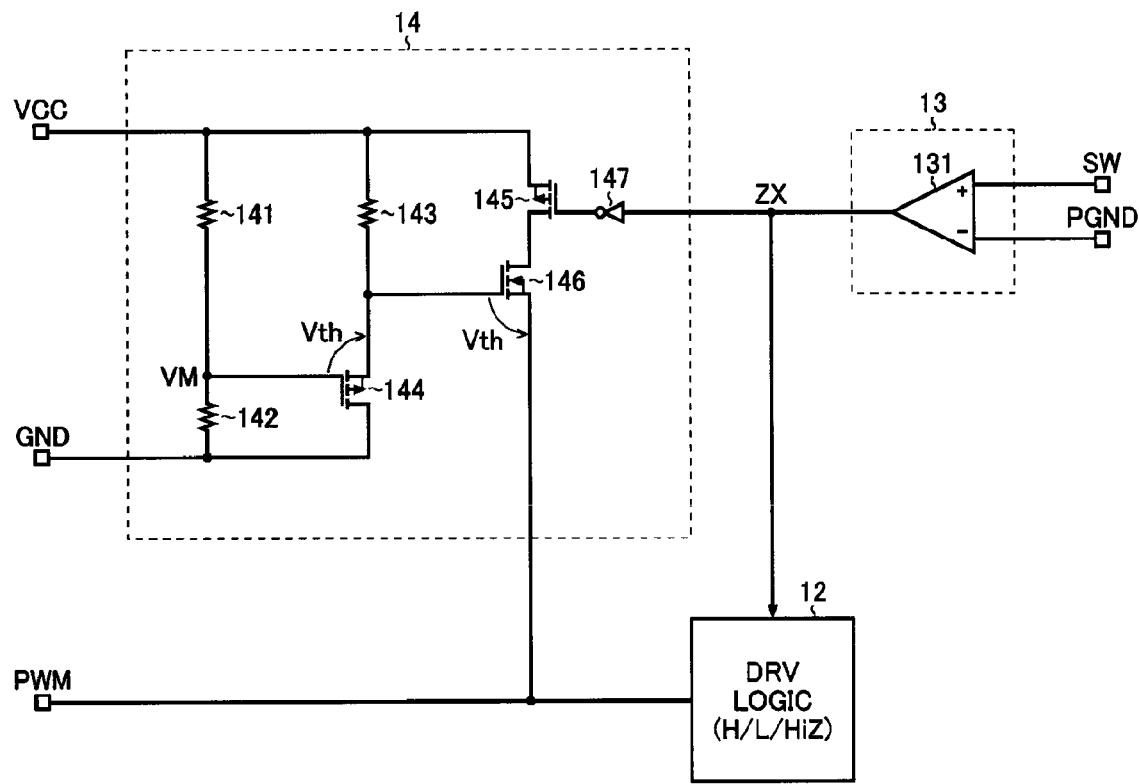
FIG. 3 is a view showing an example of a configuration of a logic level switching circuit.

FIG. 3 is a view showing a configuration example of the logic level switching circuit 14. The logic level switching circuit 14 includes resistors 141 to 143, P-channel MOS field effect transistors 144 and 145, an N-channel MOS field effect transistor 146, and an inverter 147.

The first ends of the resistors 141 and 143 and the source and back gate of the transistor 145 are connected to the application terminal of the power supply voltage VCC (for example, 3V). The second end of the resistor 141 and the first end of the resistor 142 are connected to the gate of the transistor 144 as an application terminal of an intermediate voltage VM (for example, VCC/2=1.5V). The second end of the resistor 142 and the drain of the transistor 144 are connected to the application terminal of the ground voltage GND. The second end of the resistor 143 and the source and back gate of the transistor 144 are connected to the gate of the transistor 146. The drain of the transistor 146 is connected to the drain of the transistor 145. The source and back gate of the transistor 146 are connected to the application terminal of the control signal PWM. The gate of the transistor 145 is connected to the output terminal of the inverter 147. The input terminal of the inverter 147 is connected to the application terminal (=the output terminal of a comparator 131 constituting the zero-cross detection circuit 13) of the zero-cross detection signal ZX. The non-inverting input terminal (+) of the comparator 131 is connected to the application terminal of the switch voltage SW. The inverting input terminal (−) of the comparator 131 is connected to the application terminal of the ground voltage PGND.

In the ON period (PWM=L and G1=G2=H) of the transistor M2, when an inductor current IL flows in the positive direction (=a direction from the transistor M2 toward the inductor L1), since SW<PGND, ZX=L. Accordingly, since the transistor 145 is turned off, a drain current does not flow through the transistor 146, and PWM remains at L (for example, GND).

On the other hand, when the inductor current IL begins to flow in the negative direction (=a direction from the inductor L1 toward the transistor M2), since SW>PGND, ZX=H. Accordingly, since the transistor 145 is turned on, a drain current flows through the transistor 146, and the source of the transistor 146 is biased to the intermediate voltage VM (=VM+Vth−Vth). By such an operation, the control signal PWM is switched from the L level (GND) to the M level (VM).

<Logic Level Fixing Circuit>

The drive module 10, may further include a logic level fixing circuit 15 of a pull-down type (FIG. 4) or a pull-up type (FIG. 5), which is integrated in the driver module 10, as a means for notifying the power supply controller 20 of identification information for each model (for example, information for identifying whether the drive module 10 is a large current output type or a small current output type). Hereinafter, the configuration and operation of the circuit will be described with reference to FIGS. 4 and 5.

Figure 4:
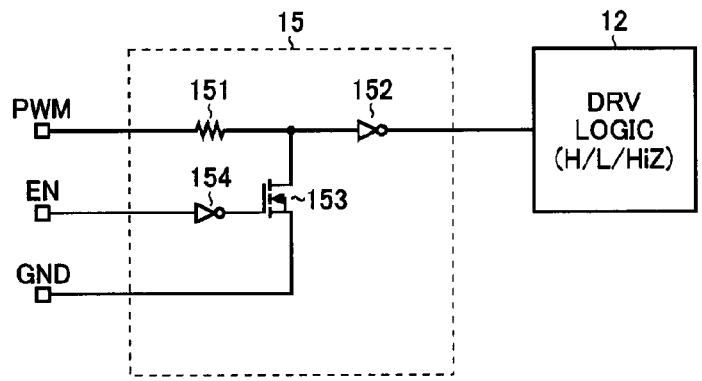
FIG. 4 is a view showing a first configuration example (pull-down type) of a logic level fixing circuit.

FIG. 4 is a view showing a first configuration example (pull-down type) of the logic level fixing circuit 15. The logic level fixing circuit 15 of this configuration example is a circuit block integrated in, for example, a large current output type (Io=15A) driving module 10, and includes a resistor 151, an inverter 152, an N-channel MOS field effect transistor 153, and an inverter 154.

The first end of the resistor 151 is connected to the application terminal of the control signal PWM. The second end of the resistor 151 and the input terminal of the inverter 152 are connected to the drain of the transistor 153. The output terminal of the inverter 152 is connected to the input terminal of the drive logic circuit 12. The source and back gate of the transistor 153 are connected to the application terminal of the ground voltage GND. The gate of the transistor 153 is connected to the output terminal of the inverter 154. The input terminal of the inverter 154 is connected to the application terminal of the enable signal EN.

When the enable signal EN is at H level or M level (=a logic level when the drive module 10 is enabled, for example, VCC or VCC/2), the transistor 153 is turned off. Accordingly, the control signal PWM is input to the drive logic circuit 12 without being pulled down.

On the other hand, when the enable signal EN is at L level (=a logic level when the drive module 10 is disabled, for example, GND), the transistor 153 is turned on. Accordingly, the control signal PWM is pulled down to the L level (GND).

Figure 5:
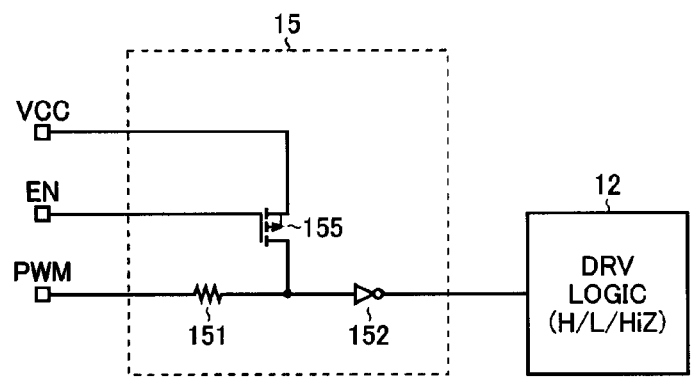
FIG. 5 is a view showing a second configuration example (pull-down type) of the logic level fixing circuit.

FIG. 5 is a view showing a second configuration example (pull-up type) of the logic level fixing circuit. The logic level fixing circuit 15 of this configuration example is a circuit block integrated in, for example, a drive module 10 of small current output type (Io=SA), and includes a resistor 151, an inverter 152, and a P-channel MOS field effect transistor 155.

The first end of the resistor 151 is connected to the application terminal of the control signal PWM. The second end of the resistor 151 and the input terminal of the inverter 152 are connected to the drain of the transistor 155. The output terminal of the inverter 152 is connected to the input terminal of the drive logic circuit 12. The source and back gate of the transistor 155 are connected to the application terminal of the power supply voltage VCC. The gate of the transistor 155 is connected to the application terminal of the enable signal EN.

When the enable signal EN is at H level or M level (=a logic level when the drive module 10 is enabled, for example, VCC or VCC/2), the transistor 155 is turned off. Accordingly, the control signal PWM is input to the drive logic circuit 12 without being pulled up.

On the other hand, when the enable signal EN is at L level (=a logic level when the drive module 10 is disabled, for example, GND), the transistor 155 is turned on. Accordingly, the control signal PWM is pulled up to the H level (VCC).

In this manner, the logic level fixing circuit 15 fixes the control signal PWM to a logic level (H level or L level) depending on each model while the drive module 10 is being disabled (EN=L), in other words, until the drive module 10 is enabled (EN=H or EN=M).

<Input/Output Circuit>

Figure 6:
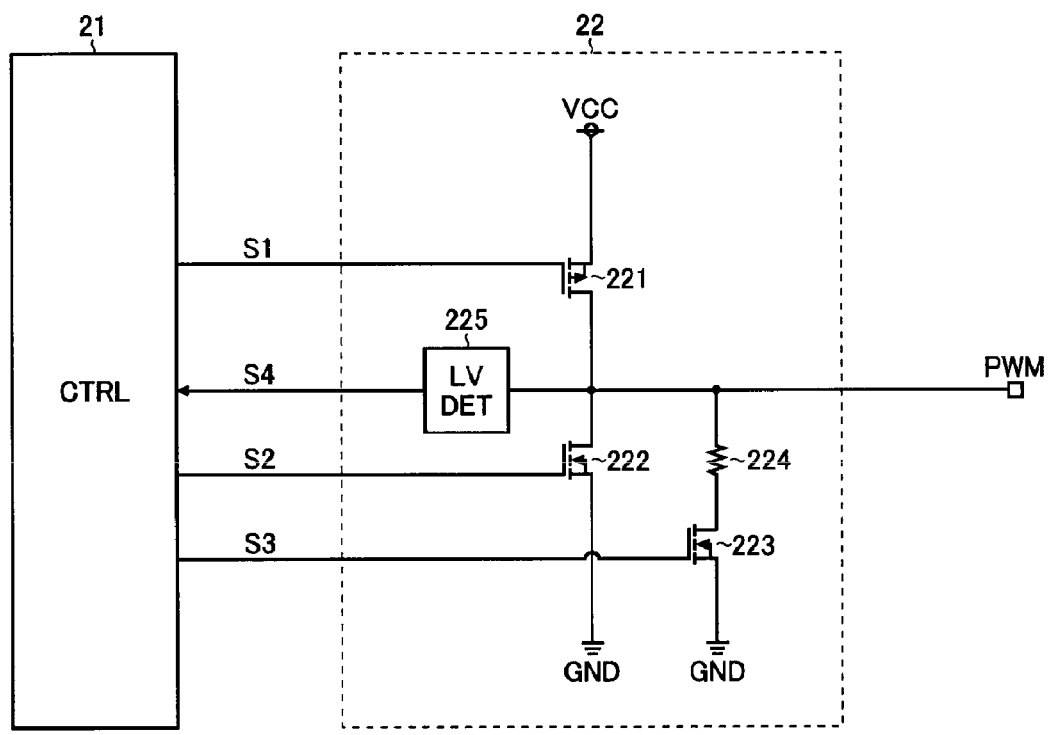
FIG. 6 is a view showing an example of a configuration of an input/output circuit.

FIG. 6 is a view showing a configuration example of the input/output circuit 22. The input/output circuit 22 of this configuration example includes a P-channel MOS field effect transistor 221, N-channel MOS field effect transistors 222 and 223, a resistor 224, and a logic level detection part 225.

The source and back gate of the transistor 221 are connected to the application terminal of the power supply voltage VCC. The drains of the transistors 221 and 222 and the first end of the resistor 224 are connected to the input/output terminal of the control signal PWM. The second end of the resistor 224 is connected to the drain of the transistor 223. The sources and back gates of the transistors 222 and 223 are connected to the application terminal of the ground voltage GND.

Gate signals S1 to S3 are input from the control circuit 21 to the gates of the transistors 221 to 223, respectively.

For example, when the H level of the control signal PWM is output, S1=S2=S3=L. As a result, since the transistor 221 is turned on and the transistors 222 and 223 are turned off, PWM=H(≈VCC). On the other hand, when the L level of the control signal PWM is output, S1=S2=H and S3=L. As a result, since the transistor 222 is turned on and the transistors 221 and 223 are turned off, PWM=L (≈GND).

When the control signal PWM is in standby for input, S1=S3=H and S2=L. As a result, since the transistors 221 and 222 are turned off and the transistor 223 is turned on, the control signal PWM is pulled down via the resistor 224. Accordingly, the control signal PWM has a logic level according to operation state of the logic level switching circuit 14 (FIG. 3) or the logic level fixing circuit 15 or connection state of the drive module 10 (details of which will be described later).

The logic level detection part 225 detects the logic level (H/L/M) of the control signal PWM when the input/output circuit 22 is in the input standby state, and outputs the detection result as a logic level detection signal S4 to the control circuit 21.

<Timing Chart>

Figure 7:
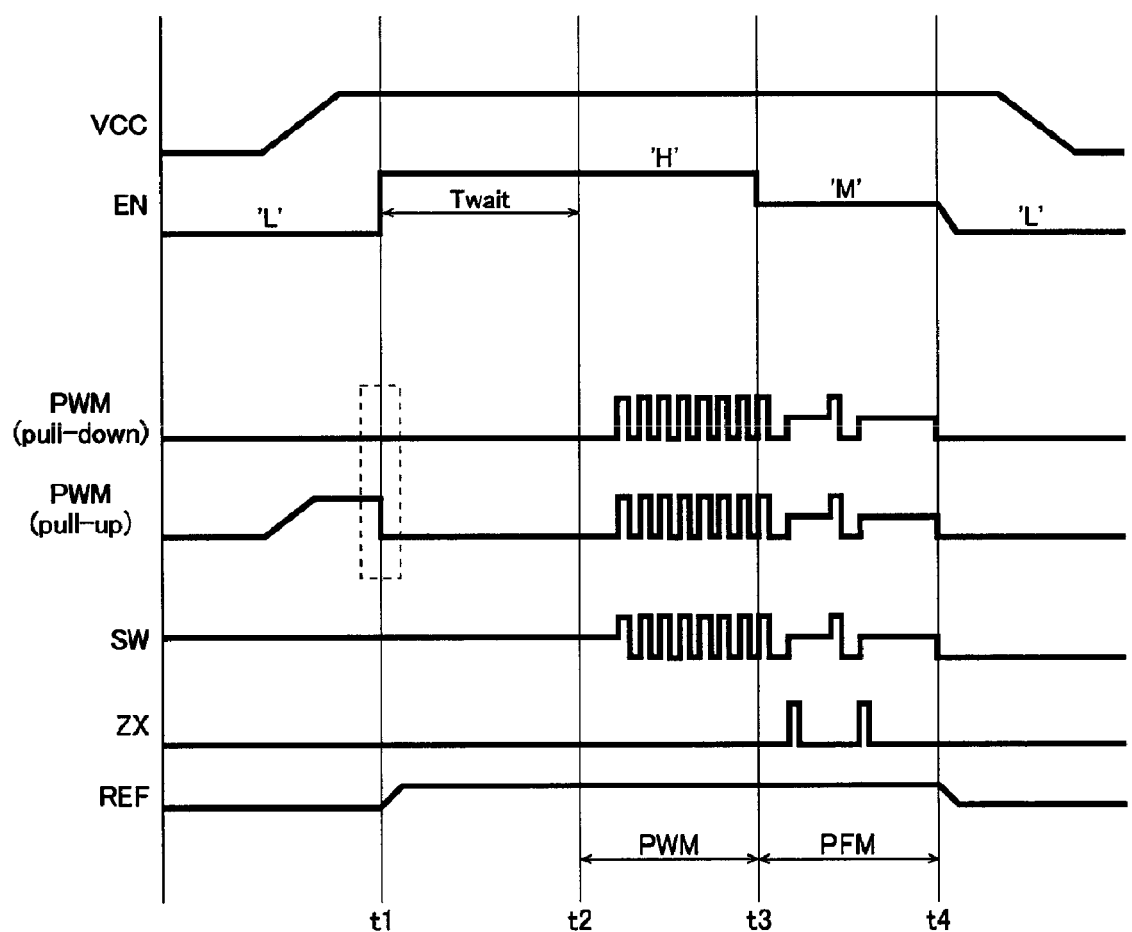
FIG. 7 is a view showing an example of operation of the switching power supply.

FIG. 7 is a timing chart showing an operation example (starting sequence) of the switching power supply 1, depicting the power supply voltage VCC, the enable signal EN, the control signals PWM (upper stage: when the logic level fixing circuit 15 is of a pulled-down type (FIG. 4); and lower stage: when the logic level fixing circuit 15 is of a pull-up type (FIG. 5)), the switch voltage SW, the zero-cross detection signal ZX, and the internal reference voltage REF from the top.

Prior to time t1, the enable signal EN is at L level. At this time, since the input/output circuit 22 of the power supply controller 20 is in the input standby state described above, the logic level (H/L/M) of the control signal PWM is detected.

Here, when PWM=L, since the logic level fixing circuit 15 is of the pull-down type (FIG. 4), for example, the drive module 10 can be discriminated as a large current output type. On the other hand, when PWM=H, since the logic level fixing circuit 15 is of the pull-up type (FIG. 5), for example, the drive module 10 can be discriminated as a small current output type.

By discriminating the model of the drive module 10 in this manner, it is possible to switch control parameters (such as a feedback coefficient or a phase compensation amount of an output current feedback loop) of the power supply controller 20 to optimal values.

The maximum number of drive phases of the switching power supply 1 is four.

However, when the output current Io required for the load Z is small, the number of drive phases of the switching power supply 1 may be reduced in order to eliminate the over specification of current supply capability. In this case, the input/output terminal of the input/output circuit 22 to which the drive module 10 is not connected (=the input/output terminal of the control signal PWM) is desirably pulled up to M level (for example, VCC/2) that is neither H level nor L level.

With such a configuration, in the input standby state when EN=L, it can be determined that the drive module 10 is not connected for a phase where PWM=M. Accordingly, it is possible to perform phase shift control (details of which will be described later) according to the actual number of drive phases (the number of drive channels).

The above-described model discrimination and connection determination of the drive module 10 may performed after the power supply voltage VCC sufficiently rises and the logic level of the control signal PWM is determined, in some embodiments. For example, as indicated by a broken line frame in the figure, they may be performed at the timing (time t1) when the enable signal EN rises from the L level to the H level.

At time t1, when the enable signal EN rises to the H level, generation of the internal reference voltage REF is started. However, even after the enable signal EN rises to the high level, the drive module 10 remains in an operation stop state (output high impedance state) until time t2 when a start waiting time Twait (for example, 64 μs) of the internal reference voltage REF elapses.

Next, an operation when the drive module 10 is enabled in the first operation mode (=an operation mode in which pulse driving of the switch voltage SW is always performed according to the control signal PWM) will be described by focusing on times t2 to t3 (EN=H).

In this case, the input/output circuit 22 of the power supply controller 20 is always fixed to an output state (=a state where the transistor 223 in FIG. 6 is turned off and the logic level detection part 225 is disabled). Accordingly, even when the load Z becomes light, the switching power supply 1 is not switched from the heavy load mode (PWM mode) to the light load mode (PFM mode), and a switching pulse of the control signal PWM is continuously generated at a constant switching frequency.

Next, an operation when the drive module 10 is enabled in the second operation mode (= an operation mode in which, in the zero-cross detection of the inductor current IL, the control signal PWM is switched to the M level by itself and the switch voltage SW enters the output high impedance state (HiZ) by itself) will be described by focusing on times t3 to t4 (EN=M).

In this case, the input/output circuit 22 of the power supply controller 20 is switched to the input standby state (=a state where both the transistors 221 and 223 in FIG. 6 are turned off, the transistor 223 is turned on, and the logic level detection part 225 is enabled) at an appropriate timing after the control signal PWM is switched from the H level to the L level, to detect the logic level (H/L/M) of the control signal PWM.

Accordingly, in the ON period of the transistor M2, when the zero-cross detection signal ZX rises to the H level and the control signal PWM is switched from the L level to the M level, the power supply controller 20 (particularly, the control circuit 21) can recognize that the zero-cross of the inductor current IL is detected by the drive module 10, and can transition the switching power supply 1 from the heavy load mode (PWM mode) to the light load mode (PFM mode) without delay. Accordingly, it is possible to increase the efficiency at the light load by thinning out the switching pulse of the control signal PWM.

After the zero-cross detection signal ZX falls to the L level again, the control signal PWM is maintained at the M level only by the source capability of the logic level switching circuit 14. Accordingly, the subsequent pulse driving of the control signal PWM will not be hindered.

As a matter of course, even when the drive module 10 is enabled in the second operation mode (EN=M), if the zero-cross detection signal ZX does not rise to the H level, the control signal PWM is not switched to the M level, and the switching power supply 1 is not switched from the heavy load mode (PWM mode) to the light load mode (PFM mode).

As described above, when the zero-cross detection circuit 13 and the logic level switching circuit 14 (M level output circuit) are incorporated in the drive module 10 and the input/output circuit 22 addressing three values (H/M/L) is incorporated in the power supply controller 20, the existing control signal PWM can be used to notify the zero-cross detection from the drive module 10 to the power supply controller 20.

Accordingly, it is possible to eliminate a need for external components (resistors and capacitors) for current detection and reduce the number of signals required for each driving module 10 of one phase (one channel) to only one.

<Phase Shift Control>

Figure 8:
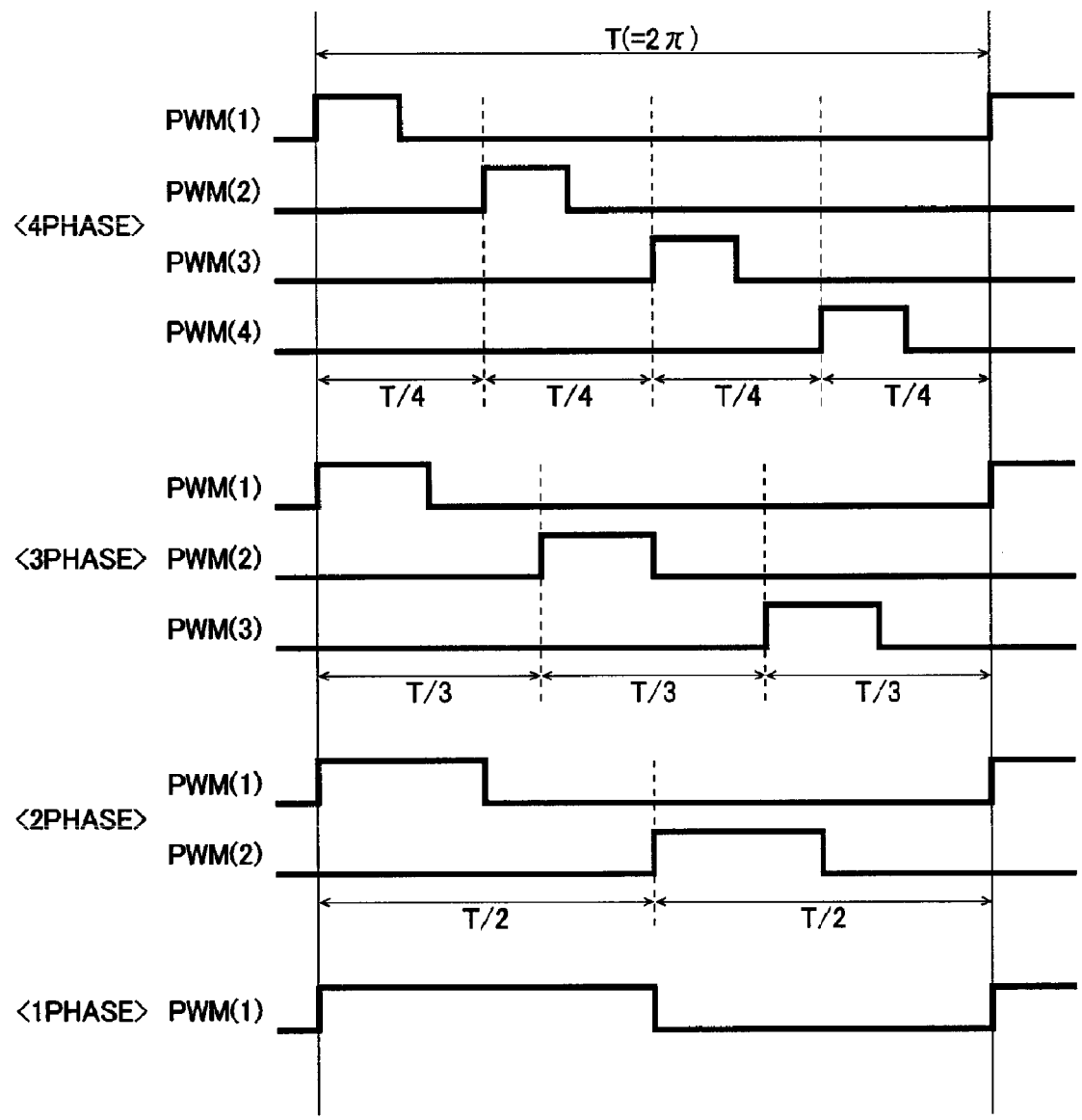
FIG. 8 is a view showing an example of phase shift control.

FIG. 8 is a timing chart showing an example of phase shift control according to the number of drive phases (the number of drive channels), depicting from the top the control signals PWM(1) to PWM(4) for four-phase driving, the control signals PWM(1) to PWM(3) for three-phase driving, the control signals PWM(1) and PWM(2) for two-phase driving, and the control signal PWM (1) for one-phase driving.

When a switching cycle is T ($=2\pi$), the control signals PWM(1) to PWM(4) are generated with a phase shift by T/4 ($=\pi/2$) for four-phase driving. The control signals PWM(1) to PWM (3) are generated with a phase shift by T/3 ($=2\pi/3$) for three-phase driving. The control signals PWM(1) and PWM (2) are generated with a phase shift by T/2 ($=\pi$) for two-phase driving. That is, the power supply controller 20 drives n-phase (where n≥2) drive modules 10(1) to 10($n$) with a phase shift by $2\pi/n$. Note that only the control signal PWM(1) is generated for one-phase driving.

<Terminal Arrangement>

In order to reduce a mounting area of the driving module 10 on a printed wiring board, for example, WLCSP in which a portion of a semiconductor chip is exposed as it is without internal wiring using a bonding wire may be used as a package of the driving module 10, in some embodiments. The terminal arrangement when the WLCSP is employed will be described below.

Figure 9:
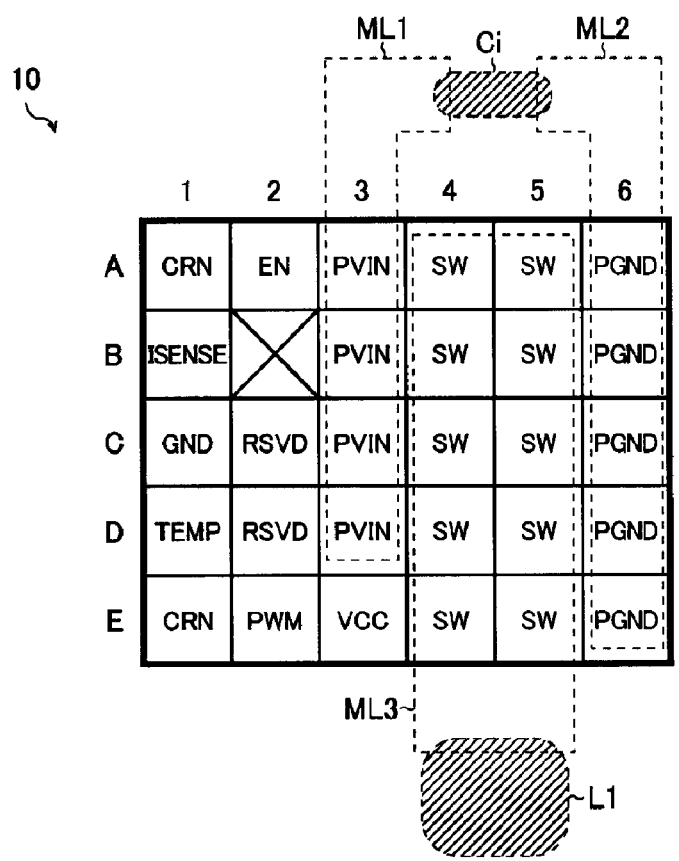
FIG. 9 is a view showing an example of terminal arrangement of a drive module (small current type).

FIG. 9 is a view showing an example of terminal arrangement of the drive module 10 (small current output type), depicting the terminal arrangement when the drive module 10 is seen through the front side. In the following description, vertical and horizontal directions of the paper surface are respectively defined as vertical and horizontal directions of the drive module 10.

A plurality of external terminals in the form of a matrix of 5 vertical rows (from top to bottom, rows A, B, C, D and E)×6 horizontal columns (from left to right, first to sixth columns) are arranged on the back surface of the drive module 10. In the following description, a position of x-th row×y-th column is referred to as a "position xy."

Focusing on the first column, CRN terminals (=unused corner terminals) are disposed at positions A1 and E1. An ISENSE terminal (=current detection terminal for OCP) is disposed at a position B1. A GND terminal (=application terminal of the ground voltage GND) is disposed at a position C1. A TEMP terminal (=temperature detection terminal for TSD) is disposed at a position D1.

Focusing on the second column, an EN terminal (=input terminal of the enable signal EN) is disposed at a position A2. A position B2 is blank. RSVD terminals (=unused reserve terminals) are disposed at positions C2 and D2. A PWM terminal (=input/output terminal of the control signal PWM) is disposed at a position E2.

Focusing on the third column, a PVIN terminal group (=application terminal group of the input voltage PVIN) is disposed at positions A3, B3, C3, and D3. A VCC terminal (=application terminal of the power supply voltage VCC) is disposed at a position E3.

An SW terminal group (=output terminal group of the switch voltage SW) is disposed in the fourth and fifth columns. PGND terminals (=application terminals of the ground voltage PGND) are disposed in the sixth column.

As shown in this figure, at least a part (the positions A4 and A5, the positions B4 and B5, the positions C4 and C5, and the positions D4 and D5) of the SW terminal group are arranged between the PVIN terminal group (the position A3, the position B3, the position C3, and the position D3) and the PGND terminal group (the position A6, the position B6, the position C6, and the position D6) in a plan view of package.

By adopting such terminal arrangement, on a printed wiring board on which the driving module 10 is mounted, metal wirings ML1 and ML2 connected respectively to the PVIN terminal group and the PGND terminal group can be laid to extend upward from the driving module 10, and a metal wiring ML3 connected to the SW terminal group can be laid to extend downward from the drive module 10. Accordingly, it is not necessary to consider a mutual interference between the metal wirings ML1 and ML2 and the metal wiring ML3, so that a degree of freedom in wiring layout is increased. Further, since there is a gap between the metal wirings ML1 and ML2 as much as the SW terminal group is sandwiched between the metal wirings ML1 and ML2, the capacitor Ci may also be easily disposed in the vicinity of the drive module 10.

Figure 10:
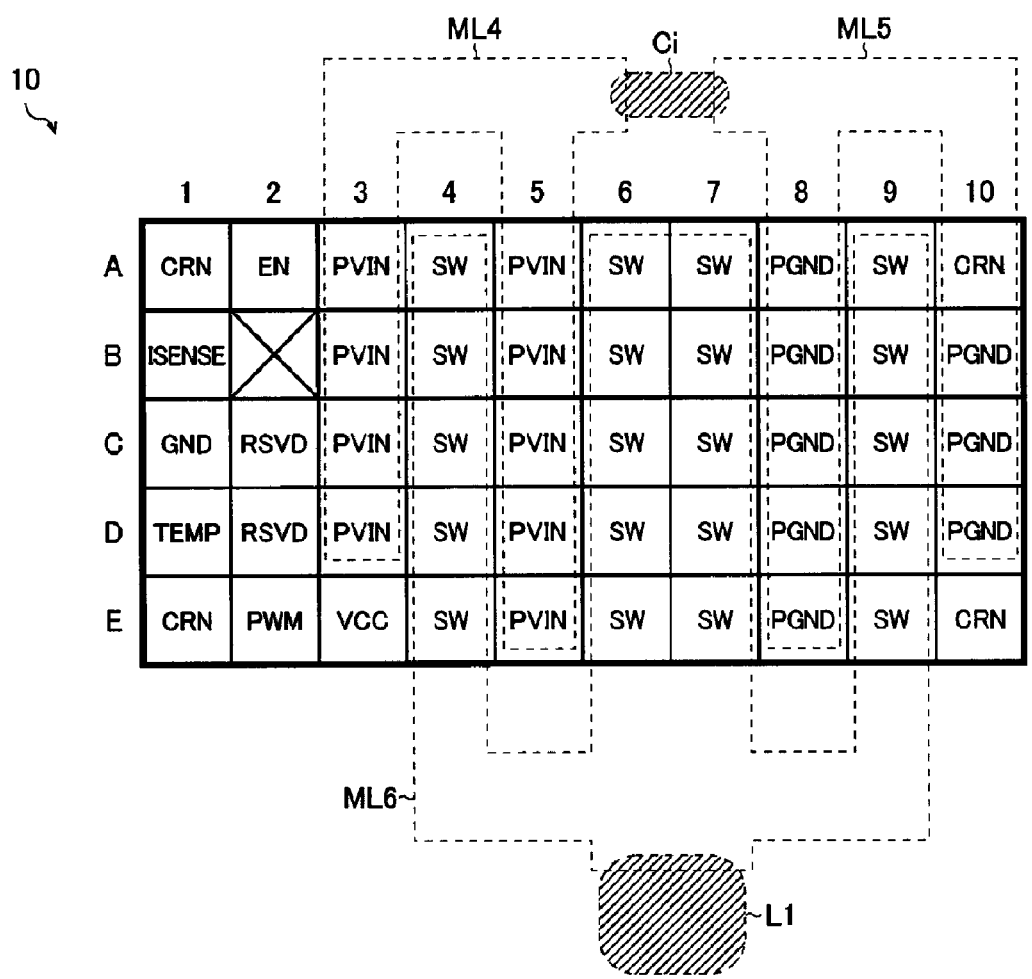
FIG. 10 is a view showing an example of terminal arrangement of a drive module (large current type).
Figure 11:
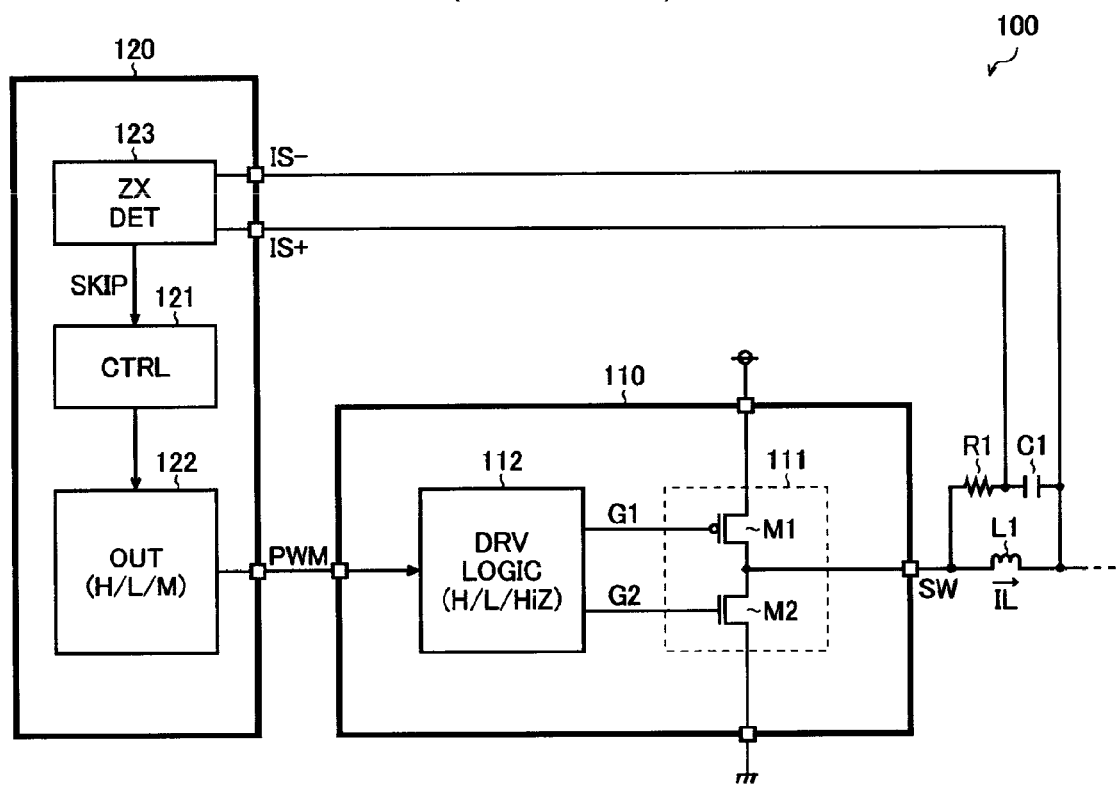
FIG. 11 is a view showing a first example of a switching power supply in the related art.
Figure 12:
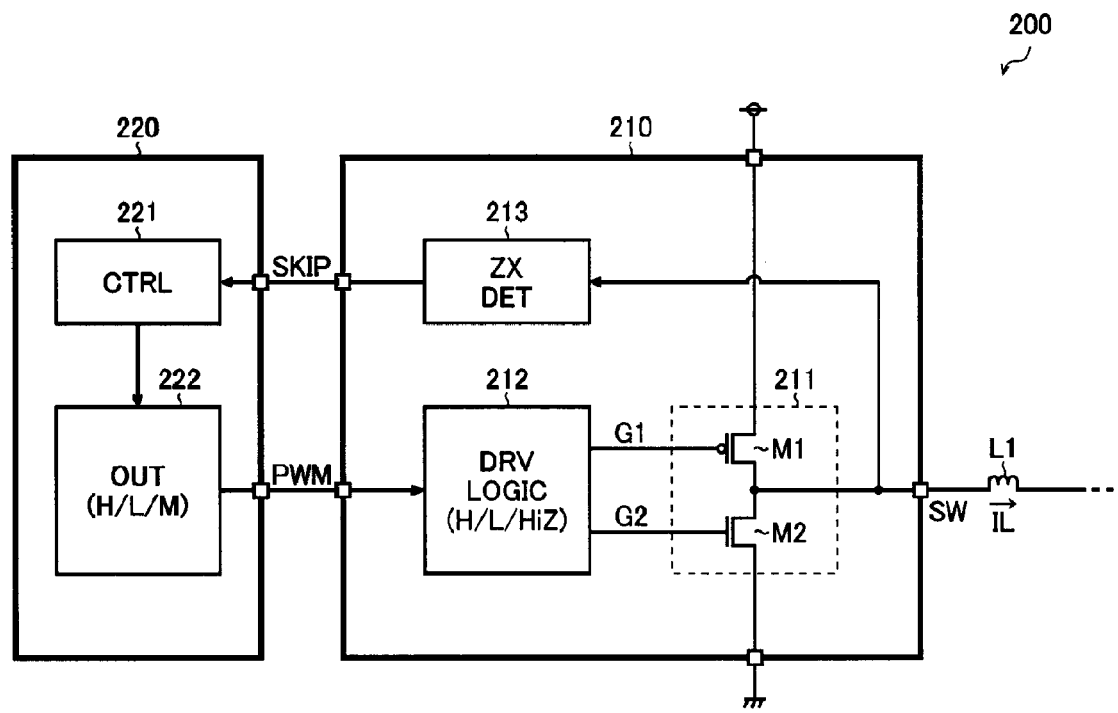
FIG. 12 is a view showing a second example of the switching power supply in the related art.

FIG. 10 is a view showing an example of a terminal arrangement of the drive module 10 (large current output type), depicting the terminal arrangement when the drive module 10 is seen through the front side. In the following description, the vertical and horizontal directions of the paper surface are respectively defined as the vertical and horizontal directions of the drive module 10.

A plurality of external terminals in the form of a matrix of 5 vertical rows (from top to bottom, rows A, B, C, D and E)×10 horizontal columns (from left to right, first to tenth columns) are arranged on the back surface of the drive module 10. In the following description, a position of x-th row×y-th column is referred to as a "position xy."

The terminal arrangements of the first to fourth columns are the same as those in FIG. 9, and explanation thereof will not be repeated.

A PVIN terminal group is disposed in the fifth column. An SW terminal group is disposed in the sixth and seventh columns. A PGND terminal group is disposed in the eighth column. An SW terminal group is disposed in the ninth column.

Focusing on the tenth column, CRN terminals (=unused corner terminals) are disposed at positions A10 and E10. A PGND terminal group is disposed at positions B10, C10, and D10.

In this way, by increasing the number of PVIN terminal groups, SW terminal groups, and PGND terminal groups, a large output current Io can be flowed. In addition, similar to FIG. 9, at least a part (the sixth and seventh columns) of the SW terminal group are arranged between the PVIN terminal group (the fifth column) and the PGND terminal group (the eighth column) in a plan view of package. Accordingly, on a printed wiring board on which the driving module 10 is mounted, mutual interference between metal wirings ML4 and ML5 connected respectively to the PVIN terminal group and the PGND terminal group and a metal wiring ML6 connected to the SW terminal group is not taken into consideration, so that the degree of freedom in wiring layout is increased. Further, when the capacitor Ci is mounted in a gap between the metal wirings ML4 and ML5, a distance between the drive module 10 and the capacitor Ci can be reduced.

<Other Modifications>

The various technical features described in the present disclosure may be modified in various forms without departing from the spirit of technical concept in the disclosure in addition to the above-described embodiments. That is, the above-described embodiments should be considered as illustrative and not restrictive in every aspect, and the technical scope of the present disclosure is not limited to the above-described embodiments, but should be understood to cover all modifications that fall within the meaning and scope equivalent to the claims.

INDUSTRIAL APPLICABILITY

The present disclosure can be applied to, for example, a multi-phase switching power supply that supplies power to a load (such as a CPU) that consumes a large current.

According to the present disclosure in some embodiments, it is possible to provide a drive module and a power supply controller with a few required signals and external components, and a switching power supply including the same.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A drive module for use in a switching power supply that generates an output voltage from an input voltage by turning on/off an output transistor and a synchronous rectification transistor, the drive module comprising:
a zero-cross detection circuit configured to detect a zero-cross of an inductor current that flows when the synchronous rectification transistor is turned on;
a drive logic circuit configured to turn on the output transistor and turn off the synchronous rectification transistor when a control signal is at a first logic level, turn off the output transistor and turn on the synchronous rectification transistor when the control signal is at a second logic level, and turn off both the output transistor and the synchronous rectification transistor when the zero-cross is detected; and
a logic level switching circuit configured to switch the control signal to a third logic level that is neither the first logic level nor the second logic level when the zero-cross is detected,
wherein the zero-cross detection circuit, the drive logic circuit, and the logic level switching circuit are integrated in a single package.

2. The drive module of claim 1, wherein the output transistor and the synchronous rectification transistor are further integrated in the package.

3. The drive module of claim 2, wherein the package is a WLCSP (Wafer Level Chip Size Package), and
wherein at least a part of switch terminal groups connected to both the output transistor and the synchronous rectification transistor are arranged between an input voltage terminal group and a ground voltage terminal group in a plan view of the package.

4. A power supply controller for use in a switching power supply that generates an output voltage from an input voltage by turning on/off an output transistor and a synchronous rectification transistor, the power supply controller comprising:
an input/output circuit configured to set a control signal to a first logic level when the output transistor is turned on and the synchronous rectification transistor is turned off, set the control signal to a second logic level when the output transistor is turned off and the synchronous rectification transistor is turned on, and enter an input standby state after setting the control signal to the second logic level; and
a control circuit configured to detect that the control signal is switched to a third logic level that is neither the first logic level nor the second logic level in the input standby state, and transition to a light load mode,
wherein the switching power supply comprises a drive module that includes:
a zero-cross detection circuit configured to detect a zero-cross of an inductor current that flows when the synchronous rectification transistor is turned on;
a drive logic circuit configured to turn on the output transistor and turn off the synchronous rectification transistor when the control signal is at the first logic level, turn off the output transistor and turn on the synchronous rectification transistor when the control signal is at the second logic level, and turn off both the output transistor and the synchronous rectification transistor when the zero-cross is detected; and
a logic level switching circuit configured to switch the control signal to the third logic level when the zero-cross is detected, wherein the zero-cross detection circuit, the drive logic circuit, and the logic level switching circuit are integrated in a single package.

5. A switching power supply that generates an output voltage from an input voltage by turning on/off an output transistor and a synchronous rectification transistor, and supplies the output voltage thus generated to a load, the switching power supply comprising:
a drive module including:
a zero-cross detection circuit configured to detect a zero-cross of an inductor current that flows when the synchronous rectification transistor is turned on;
a drive logic circuit configured to turn on the output transistor and turn off the synchronous rectification transistor when a control signal is at a first logic level, turn off the output transistor and turn on the synchronous rectification transistor when the control signal is at a second logic level, and turn off both the output transistor and the synchronous rectification transistor when the zero-cross is detected; and
a logic level switching circuit configured to switch the control signal to a third logic level that is neither the first logic level nor the second logic level when the zero-cross is detected, wherein the zero-cross detection circuit, the drive logic circuit, and the logic level switching circuit are integrated in a single package; and
a power supply controller including:
an input/output circuit configured to set the control signal to the first logic level when the output transistor is turned on and the synchronous rectification transistor is turned off, set the control signal to the second logic level when the output transistor is turned off and the synchronous rectification transistor is turned on, and enter an input standby state after setting the control signal to the second logic level; and
a control circuit configured to detect that the control signal is switched to the third logic level in the input standby state, and transition to a light load mode.

6. The switching power supply of claim 5, wherein the drive module further includes a logic level fixing circuit that fixes the control signal to a logic level depending on a model of the drive module until the drive module is enabled, and wherein the power supply controller is configured to set the input/output circuit in the input standby state until the drive module is enabled, and perform a model discrimination or a connection determination of the drive module from the logic level of the control signal.

7. The switching power supply of claim 5, wherein the power supply controller is further configured to set an enable signal of the drive module to the first logic level when the drive module is disabled, set the enable signal to the second logic level when the drive module is enabled in a first operation mode, and set the enable signal to the third logic level when the drive module is enabled in a second operation mode.

8. The switching power supply of claim 5, wherein the drive module is provided in n parallel phases (where n≥2), and wherein the power supply controller is configured to drive the drive module of each phase by a phase shift of $2\pi/n$.

9. The switching power supply of claim 5, wherein a first wiring length from the power supply controller to the drive module is larger than a second wiring length from the drive module to the load.

10. The switching power supply of claim 5, wherein the power supply controller is configured to perform an output feedback control according to a voltage across the load that is detected by a remote sense method.

\* \* \* \* \*